Patented June 6, 1944

2,350,400

UNITED STATES PATENT OFFICE 2,350,400

PRODUCTION OF RESINS

Wilbert A. King, Memphis, Tenn., assignor, by mesne assignments, to Allied Chemical & Dye Corporation, a corporation of New York No Drawing. Application December 27, 1940, Serial No. 372,008

7 Claims. (Cl. 260—32)

This invention relates to a method of producing polystyrene resins and polymerized styrene homolog resins.

In the heat-polymerization of styrene or styrene fractions at comparatively low temperatures, say 75° to 125° C., a polymer is produced which when dissolved in toluene to form a 25% (by weight) solution has a relatively high viscosity at 25° C. The viscosity of the solution generally is recognized as an indication of the complexity of the polymer, the more viscous the solution the more complex the polymer, and for certain purposes, the better the resin. Heat-polymerization of styrene at higher temperatures yields a resin which when dissolved in toluene to form a 25% solution is substantially less viscous than the resin solution formed by dissolving the resin produced by polymerizing styrene at the comparatively low temperatures mentioned.

In heat-polymerizing styrene at the low temperatures mentioned it has not been found possible to polymerize the styrene substantially completely, even when using 100% styrene as the starting material, in a reasonable length of time. Hence, some unpolymerized styrene invariably remains in the resinous mass at the end of the polymerizing operation.

Several methods have been proposed to effect the removal or elimination of this residual monomer. For example, it has been suggested to precipitate the polymer by addition of a suitable medium which is a solvent for the monomer but not for the polymer. This precipitation method involves considerable time and difficulty to effect the separation and recovery of the polymer, and is, therefore, undesirable from a cost standpoint. It has also been proposed, particularly in connection with the treatment of the polymer produced from 100% styrene as the starting material, to elevate the temperature toward the end of the polymerization to the point where polymerization of the monomer is substantially complete in a reasonable time. This has been found to result in undesirable formation of less complex polymers, even though the major portion of the monomer is converted to the polymer at comparatively low temperature and the polymerization temperature is raised only toward the end of the operation. The use of steam or low-pressure distillation has also been proposed for removing the monomer. This necessitates heating the mixture at temperatures substantially higher than those of the original polymerization, whereupon some polymerization of monomer occurs at these higher temperatures, resulting in contamination of the high-grade polymer with less valuable low-grade polymer.

It is an object of this invention to provide a method of effecting the removal of the monomer from a styrene compound polymer produced by low-temperature polymerization of a styrene compound or fractions containing styrene compounds, which method does not result in the contamination of the high-grade polymer with less valuable polymer and effects in a simple and economical manner substantially complete removal of the monomer. Other objects and advantages of this invention will appear from the following detailed description thereof.

In accordance with this invention, styrene or a styrene homolog, or fractions containing these substances, are heat-polymerized, preferably in a vessel provided with a reflux condenser to return evolved vapors, at temperatures within the range of 75° to 125° C. to produce a high-grade polymer, and at the completion of the chosen polymerization period an organic solvent for the monomer and polymer having an initial boiling point somewhat above that of the monomer, for example, at least about 5° above the boiling point of the monomer, and not above about 225° C., is then added to the polymer-monomer mixture and the resultant solution distilled, either with live steam or under reduced pressure or by passing an inert gas therethrough, i. e. by employing low vapor-pressure distillation, to effect removal of the monomer and a portion of the solvent, a sufficient quantity of the solvent being left in the mass to prevent the concentration of the polymer increasing to a point where temperatures above 125° C. would be necessary to maintain a suitably fluid condition in the mass to effect substantially complete removal of the monomer. When the monomer has been substantially completely removed, the residual portion of the solvent is distilled off either by the use of live steam or under low pressure, e. g. an absolute pressure of one inch of mercury.

Any organic solvent for the monomer and the polymer having a boiling point within the range from about 5° above the boiling point of the monomer to about 225° C., preferably a solvent boiling from 15° C. to 25° C. above the monomer, which is inert relative to the monomer and polymer and does not form decomposition products or other reaction products under the conditions of operation which would contaminate the polymer, may be employed. As examples of such solvent may be mentioned the various trimethyl benzenes boiling in the range of about 159° to 169° C., for use with styrene polymer-monomer mixtures, Hi-flash naphtha, i. e. distillate produced in the fractional distillation of coal tar and boiling within the range of about 150° C. to 225° C. for use with styrene compounds in general, which term is used herein to include styrene and styrene homologs, and durene, isodurene, tetralin, naphthalene or 1-ethyl-4-isobutyl benzene for use with polymer-monomer mixtures of styrene homologs.

In operation it has been found that the process of this invention, involving the polymerization of nearly all or at least a major portion of the styrene or styrene homolog content of a styrene compound oil, followed by treatment as above described to remove monomer, results in substantially complete removal of the residual monomer without deleteriously affecting the polymer. The presence of solvent in the monomer-polymer mixture facilitates the removal of the monomer by distillation under reduced pressure or with steam or inert gas at temperatures not substantially above that of the polymerization temperature. Hence, if any polymerization does take place at this low temperature, the polymer thus formed is of substantially the same grade as that produced in the polymerization operation and does not deleteriously affect the polymer ultimately recovered. After complete removal of the monomer, the high-grade polymer is left dissolved in a part of the added solvent. This solvent, as above noted, is not affected by higher temperatures, and these higher temperatures necessary for the removal of the solvent, it has been found, do not affect the quality of the polymer.

The following example is illustrative of the process of this invention.

A drip-oil fraction containing 55% by weight of monomeric styrene, the remainder being chiefly orthoxylene, was heated at 100° C. for approximately forty hours. The partially polymerized material, a polymer-monomer-xylene solution, was then divided into two parts.

Part 1 was treated in accordance with this invention, namely, an equal amount of trimethyl benzenes distilling from 160° C. to 169° C. was added thereto, the mixture was distilled in a column still maintained at 24 to 30 mm. of mercury absolute pressure until the monomeric styrene had been completely removed as distillate, the still temperature remaining below 100° C. during this operation, and distillation discontinued when the top of the column temperature corresponded to 160° C. at atmospheric pressure. This required two hours. The residual solution in the still was then heated slowly until at the end of three hours the temperature in the still was 220° C. Live steam at approximately atmospheric pressure and superheated to 220° C. was then introduced into the still and this operation continued for another three hours. The resin was removed and tested for viscosity. A 25% (by weight) solution of the resin in toluene had a viscosity at 25° C. of 2400 centipoises.

The second part was charged directly to an oil-bath heated still equipped for the introduction of live steam, the temperature of the bath was raised slowly so that at the end of three hours the temperature of the still contents was 220° C. Live steam at approximately atmospheric pressure and superheated to 220° C. was then introduced into the contents of the still and this continued for another three hours. The resultant resin was removed and found to have a viscosity at 25° C. of 950 centipoises when 25% by weight of resin was dissolved in toluene.

While the above example involves polymerization of a styrene fraction containing 55% monomeric styrene by weight, it is to be understood that a styrene fraction of any desired concentration up to 100% monomeric styrene may be polymerized and treated in accordance with this invention.

In the above discussion, it is indicated the high-boiling solvent is added to the polymer-monomer mixture formed by polymerization of styrene or styrene solutions. While this represents preferred operation, it should be understood the high-boiling solvent may be added to the styrene or styrene solutions before polymerization, particularly when working with a crude of high styrene content. After polymerization, the reaction mixture is subjected to distillation as described above to remove monomer and solvent.

Since certain changes may be made in carrying out the above process without departing from the scope of the invention, it is intended that all matter contained in the above description shall be interpreted as illustrative and not in a limiting sense.

I claim:

1. A process for producing styrene polymer which comprises subjecting monomeric styrene to polymerization at a temperature not exceeding 125° C. until the major portion of the monomer has been polymerized, adding to the monomer-polymer mixture an organic solvent for the monomer and polymer having a boiling point above that of the monomer, which solvent is inert with respect to the polymer and upon subjecting to heat to effect separation thereof from the polymer does not react to form non-volatile residue or constituents deleteriously affecting the polymer, and distilling the resultant mixture at a temperature not substantially above the polymerization temperature to remove as distillate from the mixture a sufficient portion of the added solvent to insure simultaneous removal as distillate of substantially all the monomeric styrene present.

2. A process of producing styrene polymer which comprises subjecting monomeric styrene to heat-polymerization at a temperature not exceeding 125° C. until the major portion of the monomer has been polymerized, adding to the monomer-polymer mixture an organic solvent for the monomer-polymer boiling within the range of 150° C. to 225° C., which solvent is inert with respect to the polymer and upon subjection to heat to effect separation thereof from the polymer does not react to form non-volatile residue or constituents deleteriously affecting the polymer, distilling the resultant mixture at a temperature not exceeding 125° C. to remove as distillate from the mixture a sufficient portion of the added solvent to insure simultaneous removal as distillate of substantially all the monomeric styrene present, and thereafter distilling the residual solution to effect removal of the remainder of the solvent.

3. A process of producing styrene polymer which comprises subjecting to heat-polymerization a styrene monomer at a temperature not exceeding 125° C. until the major portion of the monomer has been polymerized, adding to the monomer-polymer mixture trimethyl benzene, subjecting the resultant solution to low vapor pressure distillation at a temperature not exceeding 125° C. to remove as distillate from said solution substantially all the monomeric styrene present and a portion of the trimethyl benzene, and thereafter distilling the residual solution to effect removal of the remainder of the trimethyl benzene.

4. A process of producing styrene polymer which comprises subjecting to heat-polymerization monomeric styrene at a temperature not exceeding 125° C. until the major portion of the monomer has been polymerized, adding to the monomer-polymer mixture a Hi-flash naphtha boiling within the range of 150° C. to 225° C., subjecting the resultant solution to low vapor pressure distillation at a temperature not exceeding 125° C. to remove as distillate from said solution substantially all monomeric styrene present and a portion of the solvent, and thereafter distilling the residual solution to effect removal of the remainder of the solvent.

5. A process for the production of polymerized styrene which comprises subjecting monomeric styrene to heat-polymerization at a temperature not exceeding 125° C. until the major portion of the monomer has been polymerized, adding to the monomer-polymer mixture an organic solvent for the monomer and polymer boiling within the range of about 159° C. to 169° C., which solvent is inert with respect to monomer and polymer and which solvent upon subjection to heat to effect separation thereof from the polymer will not react to form non-volatile residue or constituents deleteriously affecting the polymer, subjecting the resultant solution to low vapor-pressure distillation at a temperature not substantially above the polymerization temperature to remove as distillate from said solution substantially all monomeric styrene present and a portion of the added solvent, and subjecting the residual solution to distillation to effect removal of the remainder of the solvent as distillate.

6. In a process for producing a styrene compound polymer by subjecting monomeric styrene compound to polymerization at a temperature not exceeding 125° C. to produce a high-grade polymer containing a minor proportion of monomer, and thereafter distilling to effect removal of the monomer from the polymer, the improvement which comprises carrying out the distillation to remove monomer at a temperature not substantially above the polymerization temperature in the presence of an organic solvent for the monomer and polymer, which solvent has a boiling point substantially above that of the monomer, is inert with respect to the polymer and upon subjection to heat to effect separation thereof from the polymer does not react to form non-volatile residue or constituents deleteriously affecting the polymer, and continuing said distillation, vaporizing said solvent together with monomeric styrene compound, until substantially complete removal of said monomer and a portion of said solvent, as distillate, has been effected.

7. A process for producing a styrene compound polymer which comprises subjecting monomeric styrene compound to polymerization at a temperature not exceeding 125° C. until the major portion of the monomer has been polymerized, adding to the monomer-polymer mixture an organic solvent for the monomer and polymer having a boiling point above that of the monomer, which solvent is inert with respect to the polymer and upon subjecting to heat to effect separation thereof from the polymer does not react to form non-volatile residue or constituents deleteriously affecting the polymer, and distilling the resultant mixture at a temperature not substantially above the polymerization temperature to remove as distillate from the mixture a sufficient portion of the added solvent to insure simultaneous removal as distillate of substantially all the monomeric styrene compound present.

WILBERT A. KING.